(12) United States Patent
Kumar et al.

(10) Patent No.: US 8,942,865 B2
(45) Date of Patent: Jan. 27, 2015

(54) METHODS AND SYSTEMS FOR AIRCRAFT DATA COMMUNICATIONS OVER HETEROGENEOUS CONNECTIVITY

(71) Applicant: The Boeing Company, Seal Beach, CA (US)

(72) Inventors: Anil Kumar, Sammamish, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 28 days.

(21) Appl. No.: 13/769,684

(22) Filed: Feb. 18, 2013

(65) Prior Publication Data

US 2014/0236394 A1    Aug. 21, 2014

(51) Int. Cl.
*G06F 19/00*    (2011.01)
*H04B 3/54*    (2006.01)
*H04L 29/06*    (2006.01)

(52) U.S. Cl.
CPC ............... *G06F 19/00* (2013.01); *H04B 3/542* (2013.01); *H04L 29/06* (2013.01)
USPC .............................................. 701/3; 307/9.1

(58) Field of Classification Search
USPC ................. 701/3, 14–16, 300; 307/3, 9.1
See application file for complete search history.

(56) References Cited

U.S. PATENT DOCUMENTS

| | | | |
|---|---|---|---|
| 7,098,773 B2 * | 8/2006 | Berkman | 370/485 |
| 7,260,389 B2 | 8/2007 | Allen et al. | |
| 7,636,568 B2 | 12/2009 | Gould et al. | |
| 7,893,557 B2 | 2/2011 | Davis et al. | |
| 7,908,042 B2 | 3/2011 | Brinkley et al. | |
| 2008/0300750 A1 * | 12/2008 | Davis et al. | 701/36 |

FOREIGN PATENT DOCUMENTS

EP    2315367 A1    4/2011
WO    2008097983 A1    8/2008

OTHER PUBLICATIONS

International Search Report and Written Opinion of international application No. PCT/US2014/011543; Apr. 23, 2014; 9 pages.

* cited by examiner

*Primary Examiner* — Richard Camby
(74) *Attorney, Agent, or Firm* — Armstrong Teasdale LLP

(57) ABSTRACT

Methods and systems for communicating data between an aircraft and an off-board network are provided. The method includes pre-loading data for the aircraft onto a secure power unit, communicatively coupling the aircraft to the secure power unit, validating the aircraft at the secure power unit based on air traffic management information, absolute (GMT) time, and aircraft location data, and transferring data between the aircraft and the secure power unit based on the validation.

20 Claims, 3 Drawing Sheets

METHODS AND SYSTEMS FOR AIRCRAFT DATA COMMUNICATIONS OVER HETEROGENEOUS CONNECTIVITY

BACKGROUND

The present disclosure relates generally to aircraft communication, and more particularly to aircraft broadband communication with a data network on the ground that is supported over heterogeneous connectivity.

As technology has increased, the amount of software and data needed on-board aircraft has increased as well. This increased need is particularly evident in the size of the aircraft information system with the latest aircraft models. With the large amount of information collected during a flight that is required to be off-loaded and the passenger entertainment data that is generally uploaded between flights, the Turn Around Time (TAT) at the gate for aircraft is impacted. In order to complete this operation within the acceptable TAT, there are data efficiency challenges such as slow connectivity and security issues using known data transfer techniques.

Accordingly, there is a need for methods and systems that provide efficient and secure data transfer while the aircraft is parked at a gate between the flights over off-board connectivity available at the airport.

BRIEF DESCRIPTION

In one aspect, a method for communicating data between an aircraft and an off-board network is provided. The method includes pre-loading data for the aircraft onto a secure power unit, communicatively coupling the aircraft to the secure power unit, validating the aircraft at the secure power unit based on air traffic management information, GMT time, and aircraft location data, and transferring data between the aircraft and the secure power unit based on the validation.

In another aspect, a secure power unit configured for communication between an aircraft and an off-board network is provided. The secure power unit includes a computing device configured to pre-load data for the aircraft prior to the arrival of the aircraft, a Broadband over Power Line (BPL) module configured to transfer data to the aircraft via a power cable, and a communications device configured to communicate between the secure power unit and the off-board network.

In yet another aspect, a system for communicating between an aircraft and a off-board network is provided. The system includes a secure power unit configured to communicatively couple to the aircraft via a power cable. The system includes a computing device configured to pre-load data to the secure power unit for the aircraft prior to the arrival of the aircraft, a Broadband over Power Line (BPL) module configured to transfer data to the aircraft via the power cable, and a communications device configured to communicate between the secure power unit and the off-board network.

The features, functions, and advantages that have been discussed can be achieved independently in various implementations or may be combined in yet other implementations further details of which can be seen with reference to the following description and drawings.

DETAILED DESCRIPTION

Embodiments described herein enable aircraft broadband communication with a data network. More particularly, the present disclosure is directed to preloading aircraft specific data at a gate before arrival to minimize (turn around time) TAT. Due to the slow speed of connectivity between the computing unit at the secure power unit on the ground and the airline server, the embodiments described herein will help in fetching or pre-loading the appropriate data meant or targeted for the aircraft prior to its arrival at the gate.

Figure 1:
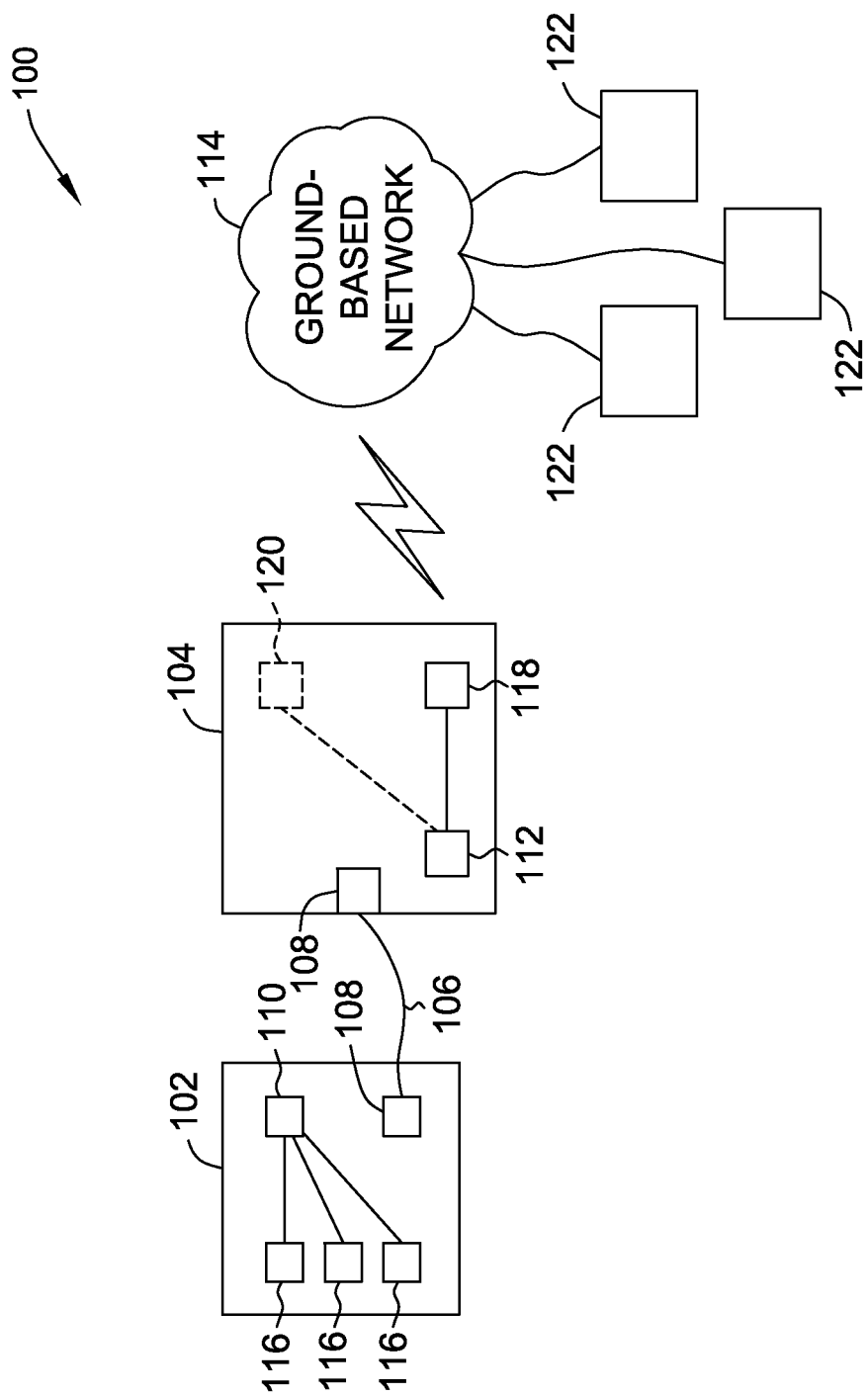
FIG. 1 is a diagram of an exemplary system that enables aircraft broadband communication with a data network.

FIG. 1 is a diagram of an exemplary system 100 for facilitating aircraft broadband communication with an off-board data network 114. System 100 works with an aircraft 102 on the ground at an airport (not shown). As used herein the term "airport" refers to any location in which aircraft, such as fixed-wing aircraft, helicopters, and/or blimps, take off and land. System 100 includes a power system 104 that supplies power to aircraft 102. In an exemplary implementation, power system 104 is a Gatebox server, i.e., a secure power unit, that supplies power to an aircraft parked on the ground at locations at or adjacent to the airport. In one implementation, power system 104 may be a conventional power delivery system used at least some known airports and designated to one gate or airport location. Power system 104 is coupled to aircraft 102 when aircraft 102 is parked at the airport. In one implementation, power system 104 is mobile power cart. An electrical cable 106, e.g., a power stinger cable or power line, couples aircraft 102 to power system 104 via at least one stinger socket 108. Power system 104 may be configured to provide 400 Hz power to the aircraft via the electric cable 106, however any suitable power for a particular type of aircraft or vehicle coupled via electric cable 106 may be provided. In one implementation, power system 104 provides a serial number and/or part information in a power equipment signature that is provided to an aircraft and/or server.

In an exemplary implementation, aircraft 102 includes an on-board BPL module 110 that enables communication via electrical cable 106. More particularly, in an exemplary implementation, on-board BPL module 110 is capable of communicating with an off-board BPL module 112. In an exemplary implementation, BPL module 110 is communicatively coupled to on-board networks 116. On-board networks 116, such as, but not limited to, include in-flight entertainment systems, avionics systems, flight control systems, central maintenance computer, Airplane Health Maintenance (AHM), Engine Data, flight bag(s) and/or cabin systems.

In an exemplary implementation, power system 104 is integrated with off-board BPL module 112 and coupled to a computing device 120 that can communicate directly with aircraft 102 to transfer data to networks 116. Off-board network 114 may be a ground-based network. In an exemplary implementation, module 112 is also coupled to a transceiver 118 that is communicatively coupled to a ground-based network 114. For example, in one implementation, transceiver 118 is a wireless transceiver that transmits data to/from network 114. Transceiver 118 may be wirelessly coupled to network 114 or physically coupled to network 114 through a wired connection. It should be noted that transceiver 118 may communicate with network 114 using any protocol that enables broadband communication as described herein.

In an exemplary implementation, aircraft 102 can receive electrical power from power system 104 via electrical cable 106 and may send/receive data communications to/from ground-based network 114 via cable 106. Moreover, in an exemplary implementation, aircraft 102 communicates via on-board BPL module 110 using TCP/IP, however any other suitable protocol can be used. In one implementation, encryption is employed to further secure communications between aircraft 102 and ground-based network 114 and/or computing device 120.

Ground-based network 114 may be communicatively coupled to one or more servers 122 that may be operated by the airline or entity that operates aircraft 102. Additionally, servers 122 may be operated by a third-party, such as the airport, an aircraft manufacturer, and/or an aircraft service provider. For example, servers 122 may be coupled to ground-based network 114 via a LAN, a WAN, and/or the Internet. Servers 122 may transmit data to and from aircraft 102. For example, data may be transferred between aircraft 102 and at least one of an airport server and an airline server. That is, power system 104 may be configured to transfer data between aircraft 102 and an airport server, or power system 104 may be configured to transfer data between aircraft 102 and an airline server, or power system 104 may be configured to transfer data between aircraft 102 and any combination or number of servers. Servers 122 may provide air traffic management information for an airport including scheduled arrival time for aircraft, gate locations for aircraft, aircraft tail number, aircraft flight position, and SKID data. Servers 122 may provide software and/or firmware updates to components of aircraft 102, such as cabin systems software, flight bag, and avionics software. Servers 122 may also provide content, such as music, movies, certificates, encryption data and/or internet data such as cached web content for in-flight entertainment systems on aircraft 102.

Although FIG. 1 illustrates power system 104 as being coupled to electrical cable 106 via off-board BPL module 112, it should be appreciated that other configurations that enable off-board BPL module to function as described herein are possible. For example, off-board BPL module 112 may communicate wirelessly with module 110 when aircraft 102 is directly coupled to power system 104 via electrical cable 106. As another example, off-board BPL module 112 may be configured to communicate wirelessly with the aircraft via computing device 120 while at the same time, communicate via electrical cable 106 when power is supplied from power system 104 to the aircraft 102.

Figure 2:
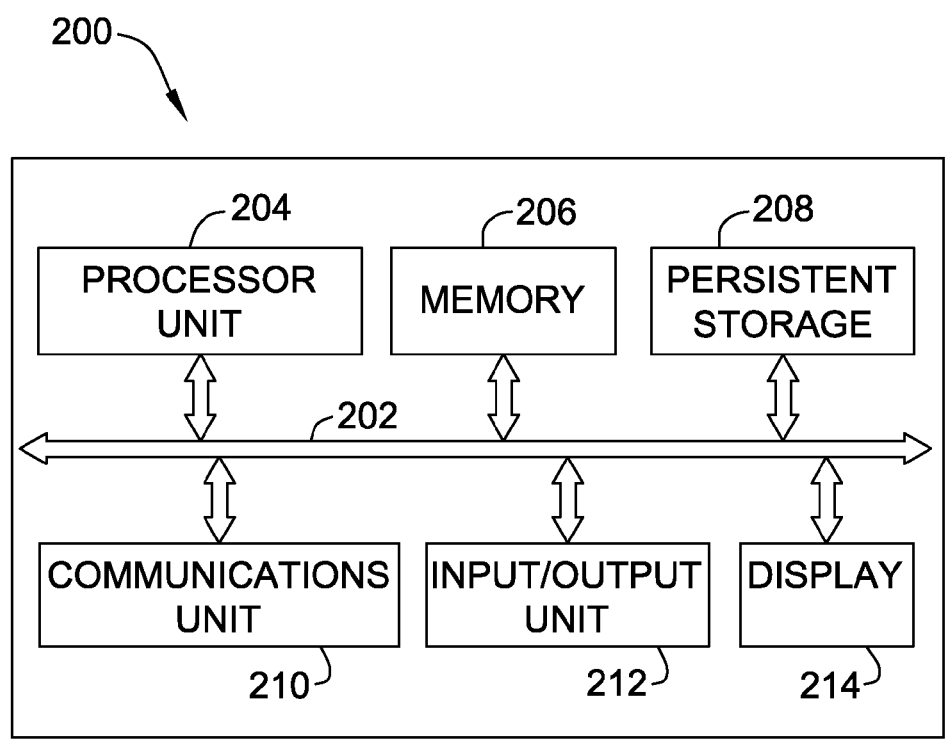
FIG. 2 is a block diagram of an exemplary computing device that may be used with the system shown in FIG. 1.

FIG. 2 is a block diagram of an exemplary computing device 200 that may be used with system 100 (shown in FIG. 1). In an exemplary implementation, computing device 200 is incorporated into power system 104. However, it should be noted that computing device 200 may be a separate device that cooperates with power system 104 such as computing device 120. In an exemplary implementation, computing device 200 includes a communications fabric 202 that enables communications between a processor unit 204, a memory 206, persistent storage 208, a communications unit 210, an input/output (I/O) unit 212, and a presentation interface, such as a display 214. In addition to, or in the alternative, presentation interface 214 may include an audio device (not shown) and/or any device capable of conveying information to a user.

Processor unit 204 executes instructions for software that may be loaded into memory 206. Processor unit 204 may be a set of one or more processors or may include multiple processor cores, depending on the particular implementation. Further, processor unit 204 may be implemented using one or more heterogeneous processor systems in which a main processor is present with secondary processors on a single chip. In another implementation, processor unit 204 may be a homogeneous processor system containing multiple processors of the same type.

Memory 206 and persistent storage 208 are examples of storage devices. As used herein, a storage device is any piece of hardware that is capable of storing information either on a temporary basis and/or a permanent basis. A storage device, such as memory 206 and/or persistent storage 208, may be configured to store data for use with the processes described herein. For example, a storage device may store data needed by networks 116 during flight.

Communications unit 210, in an exemplary implementation, enables communications with other computing devices, systems, and/or networks. In an exemplary implementation, communications unit 210 is a BPL module such as module 100 and module 112. In one implementation, communications unit 210 also includes network interface card. Communications unit 210 may provide communications through the use of physical and/or wireless communication links, such as transceiver 118.

Input/output unit 212 enables input and output of data with other devices that may be connected to computing device 200. For example, without limitation, input/output unit 212 may provide a connection for user input through a user input device, such as a keyboard, a mouse, a video camera, a microphone, and/or a still photo camera. Further, input/output unit 212 may transmit output to a printer. Display 214 provides a mechanism to display information to a user. For example, a presentation interface such as display 214 may display a graphical user interface, such as those described herein.

The different components illustrated herein for computing device 200 are not architectural limitations to the manner in which different embodiments may be implemented. Rather, the different illustrative embodiments may be implemented in a computer system including components in addition to or in place of those illustrated for computing device 200. For example, other components shown in FIG. 2 can be varied from the illustrative examples shown.

During operation, and referring to FIGS. 1 and 2, computing device 120 preloads data for aircraft 102 onto power system 104 after receiving air traffic management information for aircraft 102. Aircraft 102 is then connected to a ground power unit (GPU), e.g., power system 104, via electric cable 106, e.g., a power stinger cable. Aircraft 102 transmits a request for data transfer to power system 104 through cable 106. The secure power system 104 completes a validation or authentication procedure using off-board BPL module 112, display 214, and/or I/O unit 212. Aircraft 102 is coupled to off-board BPL modules 112 via electric cable 106 and is coupled to computing device 120. Computing device 120 may perform validation as described herein. Communication between aircraft 102 and power unit 104 may be initiated autonomously or at the direction of a user, such as a pilot or ground crew member on the aircraft end in some cases, initiating power bus connection commands from within the cockpit.

Figure 3:
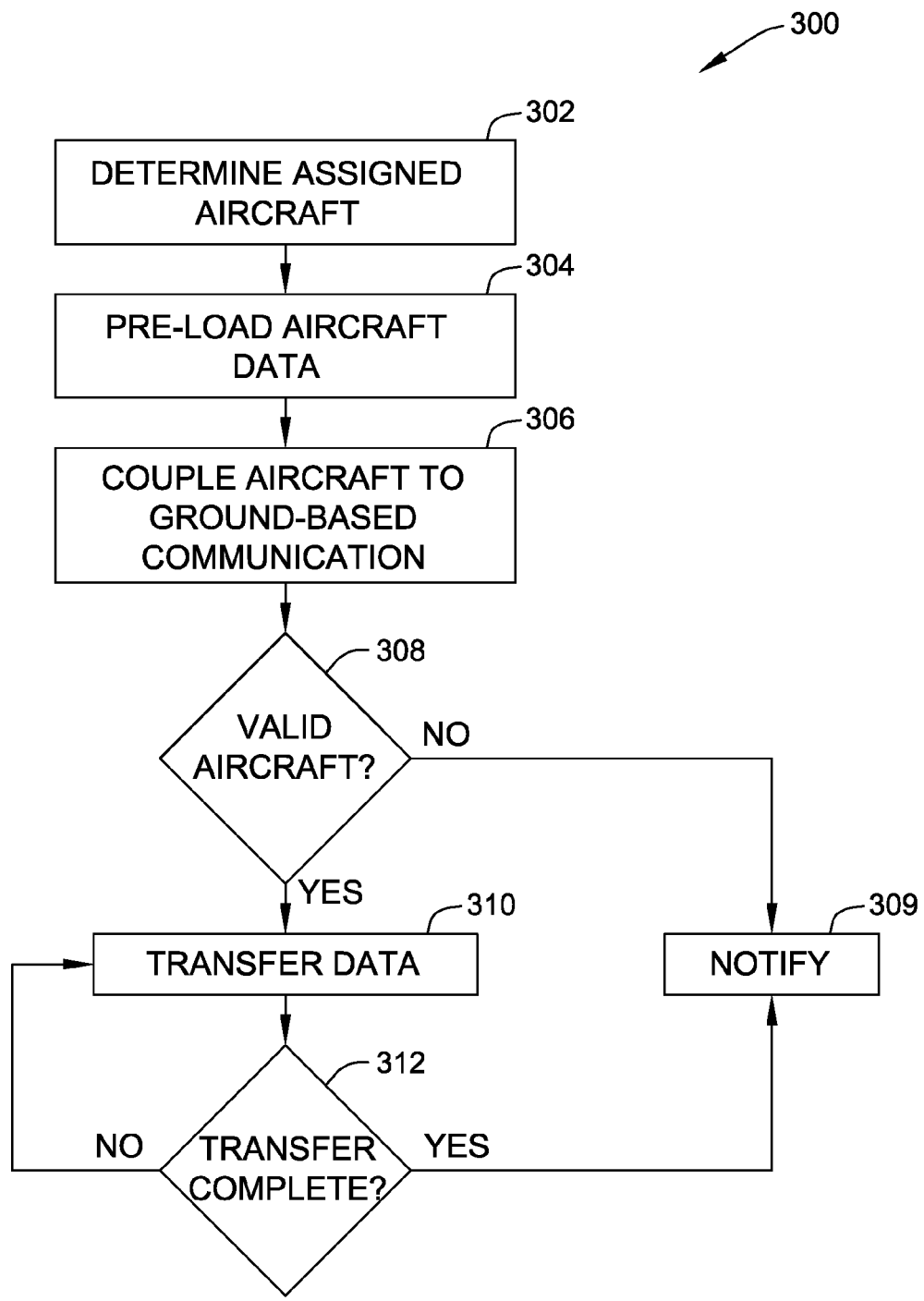
FIG. 3 is a flowchart of an exemplary method that may be implemented to enable aircraft broadband communication with a power system.

FIG. 3 is a flowchart of an exemplary method 300 that may be implemented to enable aircraft 102 broadband communication with power system 104. In an exemplary implementation, power system 104 communicates with an airport server 122 to determine if an aircraft 102 has been assigned to power system 104. In one implementation, a power system 104 is selected or assigned for pre-loading 304 data is based on a location and/or power system identification information. When aircraft 102 has been assigned to a power system 104, the assigned power system 104 determines 302 aircraft identifying information. In some implementations, aircraft identifying information is retrieved from an air traffic management (ATM) system, a system wide information management (SWIM) system, or the System for Earth Sample Registration (SESAR) database. Alternatively, aircraft identifying information can be retrieved from any source that facilitates aircraft communication as described herein. The aircraft identifying information is then communicated to servers 122 to determine if any data is required to be uploaded to aircraft 102. If data is needed by aircraft 120, power system 104 loads or pre-loads 304 data required to be transferred to aircraft 102 upon arrival. For example, pre-loading may include transferring data from an airline server to the power system 104.

In an exemplary implementation, when aircraft 102 arrives at a gate, aircraft 102 is coupled 306 to a ground-based unit, such as power unit 104, via electrical cable 106. When power is supplied to the aircraft, a BPL link from module 110 to module 112 is initiated and the aircraft is validated 308. In an exemplary implementation, aircraft 102 is validated or authenticated 308 by comparing aircraft identifying information onboard aircraft 102, e.g., a SKID card, a tail ID, and a MAC address, with aircraft identifying information stored on power unit 104. In one implementation, an aircraft is validated 308 using GPS or IRU information. Alternatively, aircraft 102 is validated 308 by comparing aircraft 102 to at least one of a scheduled arrival time, an airport, a gate, an absolute or GMT time, and an aircraft flight position.

In one implementation, if an aircraft is not validated 308, a notification is transmitted 309 to an appropriate party that a validation was not successful. In some implementations, when a notification is transmitted 309, any pre-loaded 304 data is held and not released until a manual override enables a transfer of any pre-loaded 304 data. In other implementations, when a notification is transmitted 309, pre-loaded 304 data is erased and a photo and/or video is captured of the area around power unit 104, by unit 212, to obtain situational awareness information.

In an exemplary implementation, when aircraft 102 has been validated 310, data is then transferred and/or updated 312 between aircraft 102 and power unit 104 and/or computing device 120. For example, data may be transferred between power unit 104 and aircraft 102 via electrical cable 106. As another example, data may be transferred wirelessly between power unit 104 and aircraft 102 when aircraft 102 is directly coupled to power unit 104 via electrical cable 106. Yet, as another example, data may be transferred wirelessly between power unit 104 and aircraft 102 via computing device 120 while at the same time, transferring data via electrical cable 106 when power is supplied from power unit 104 to the aircraft 102.

In one implementation, data transferred from aircraft 102 to power unit 104 and/or computing device 120 is stored for a subsequent transfer to network 114 and/or servers 122. During the transfer of data 312, power unit continually monitors for a completion of the transfer 312. In one implementation, if aircraft 102 has left power unit 104 and a transfer of files is only partially completed, a notification can be sent to network 114 and/or servers 122 and data that was not transferred can be forwarded to a power unit at the aircraft's destination. In some implementations, if transfer 312 is complete, a user can be notified and power unit 104 can erase data in preparation of the data needed for the next aircraft. If a complete data transfer fails, a notification can be transmitted to an appropriate party and data can be held until a manual override enables a transfer of the data or a complete erasure of the data can occur.

Accordingly, in an exemplary implementation, the system described herein enables aircraft broadband communication with a data network. As compared to known communication methods and systems used for airport-based aircraft communications, the above-described communication systems and methods enables secure and efficient data transfer between aircraft and ground based networks. The data transfer is more secure than known systems because the embodiments described herein facilitate protecting data from being intercepted between an airline and/or airport server and an aircraft. Additionally, because data is preloaded onto power systems, administrators of networks and/or data can be made aware of where particular data will terminate. Efficient data transfer is also achieved using the embodiments described herein by many factors due to the inherent limitations of inter-network or internet connections. Efficiencies can also be created by preloading standard data for particular aircraft types, e.g., Boeing 757, and supplementing the data with aircraft specific information.

The methods and systems described herein enable a data transfer that includes files needed to be captured from an aircraft at the end of a flight. The required files may be log files related to engine performance or any other relevant data that requires monitoring. The data can be loaded on to a Gatebox server memory prior to the delivery on a slow off-board network connectivity. Such transfer will relieve the aircraft within the TAT from the gate. Enforcement of data integrity between the data on the aircraft and that is on the ground can be applied based on the constraints adopted as part of the operations.

It will be understood by those of skill in the art that information and signals may be represented using any of a variety of different technologies and techniques (e.g., data, instructions, commands, information, signals, bits, symbols, and chirps may be represented by voltages, currents, electromagnetic waves, magnetic fields or particles, optical fields, repeatable noise signatures, typical electrical loads based on aircraft type and airline configuration. These signatures can be preloaded from known signatures or empirically collected and modified on a running average or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred implementations of the present disclosure have been described in detail, it will be understood by those skilled in the art that various modifications can be made therein without departing from the scope of the disclosure as set forth in the appended claims.

A controller, computing device, or computer, such as described herein, including the on and off-board BPL modules, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for communicating data between an aircraft and an off-board network, said method comprising:
   pre-loading data for the aircraft onto a secure power unit;
   communicatively coupling the aircraft to the secure power unit;
   validating the aircraft at the secure power unit based on air traffic management information, absolute time, and aircraft location data; and
   transferring data between the aircraft and the secure power unit based on the validation.

2. The method in accordance with claim 1, further comprising transferring data from the secure power unit to the off-board network.

3. The method in accordance with claim 1, wherein pre-loading data comprises preloading data for the aircraft based on air traffic management information including one or more of a scheduled arrival time, airport, gate, aircraft tail number, aircraft flight position, and SKID data.

4. The method in accordance with claim 1, wherein validating the aircraft at the secure power unit based on air traffic management information and aircraft location data comprises validating the aircraft based on one or more of a scheduled arrival time, airport, gate, aircraft tail number, aircraft flight position, and SKID data.

5. The method in accordance with claim 1, wherein validating the aircraft further comprises validating an aircraft location using GPS or IRU information.

6. The method in accordance with claim 1, wherein communicatively coupling the aircraft to the secure power unit further comprises coupling the secure power unit to a stinger of the aircraft via a power cable.

7. The method in accordance with claim 6, wherein transferring data further comprises transferring data between the secure power unit and the aircraft via the power cable.

8. The method in accordance with claim 1, wherein pre-loading data further comprises transferring data from an airline server to the secure power unit.

9. A secure power unit configured for communication between an aircraft and an off-board network, said secure power unit comprising:
   a computing device configured to pre-load data for the aircraft prior to the arrival of the aircraft, and validate the aircraft;
   a Broadband over Power Line (BPL) module configured to transfer data to the aircraft via a power cable; and
   a communications device configured to communicate between said secure power unit and the off-board network.

10. A secure power unit in accordance with claim 9, wherein said secure power unit is configured to provide 400 Hz power to the aircraft via the power cable.

11. A secure power unit in accordance with claim 9, wherein said secure power unit is further configured to validate the aircraft based on one or more of a scheduled arrival time, airport, gate, aircraft tail number, aircraft flight position, and SKID data.

12. A secure power unit in accordance with claim 9, wherein said secure power unit is configured to transfer data between the aircraft and at least one of an airport server and an airline server.

13. A secure power unit in accordance with claim 9, wherein said computing device is further configured to pre-load data based on based on air traffic management information including one or more of a scheduled arrival time, airport, gate, aircraft tail number, aircraft flight position, and SKID data.

14. A secure power unit in accordance with claim 9, wherein said secure power unit is further configured to validate an aircraft location using GPS or IRU information.

15. A system for communicating between an aircraft and an off-board network, said system comprising:
   a socket configured to communicatively couple to an aircraft via a power cable;
   a computing device configured to pre-load data for the aircraft prior to the arrival of the aircraft, and validate the aircraft;
   a Broadband over Power Line (BPL) module configured to transfer data to the aircraft via the power cable; and
   a communications device configured to communicate between the aircraft and the off-board network.

16. The system in accordance with claim 15, wherein the system is configured to provide 400 Hz power to the aircraft via the power cable.

17. The system in accordance with claim 15, wherein said computing device is further configured to validate the aircraft based on one or more of a scheduled arrival time, airport, gate, aircraft tail number, aircraft flight position, and SKID data.

18. The system in accordance with claim 15, wherein said computing device is configured to transfer data between the aircraft and at least one of an airport server and an airline server.

19. The system in accordance with claim 15, wherein said computing device is further configured to preload data based on based on air traffic management information including one or more of a scheduled arrival time, airport, gate, aircraft tail number, aircraft flight position, and SKID data.

20. The system in accordance with claim 15, wherein said computing device is further configured to validate an aircraft location using GPS or IRU information.

* * * * *